May 28, 1935.  F. S. CARTER  2,003,069
STEAM TRAP AND APPARATUS FOR CONTROLLING OR MAINTAINING
THE SUPPLY OF WATER OR OTHER FLUID
Filed July 7, 1932  2 Sheets-Sheet 1
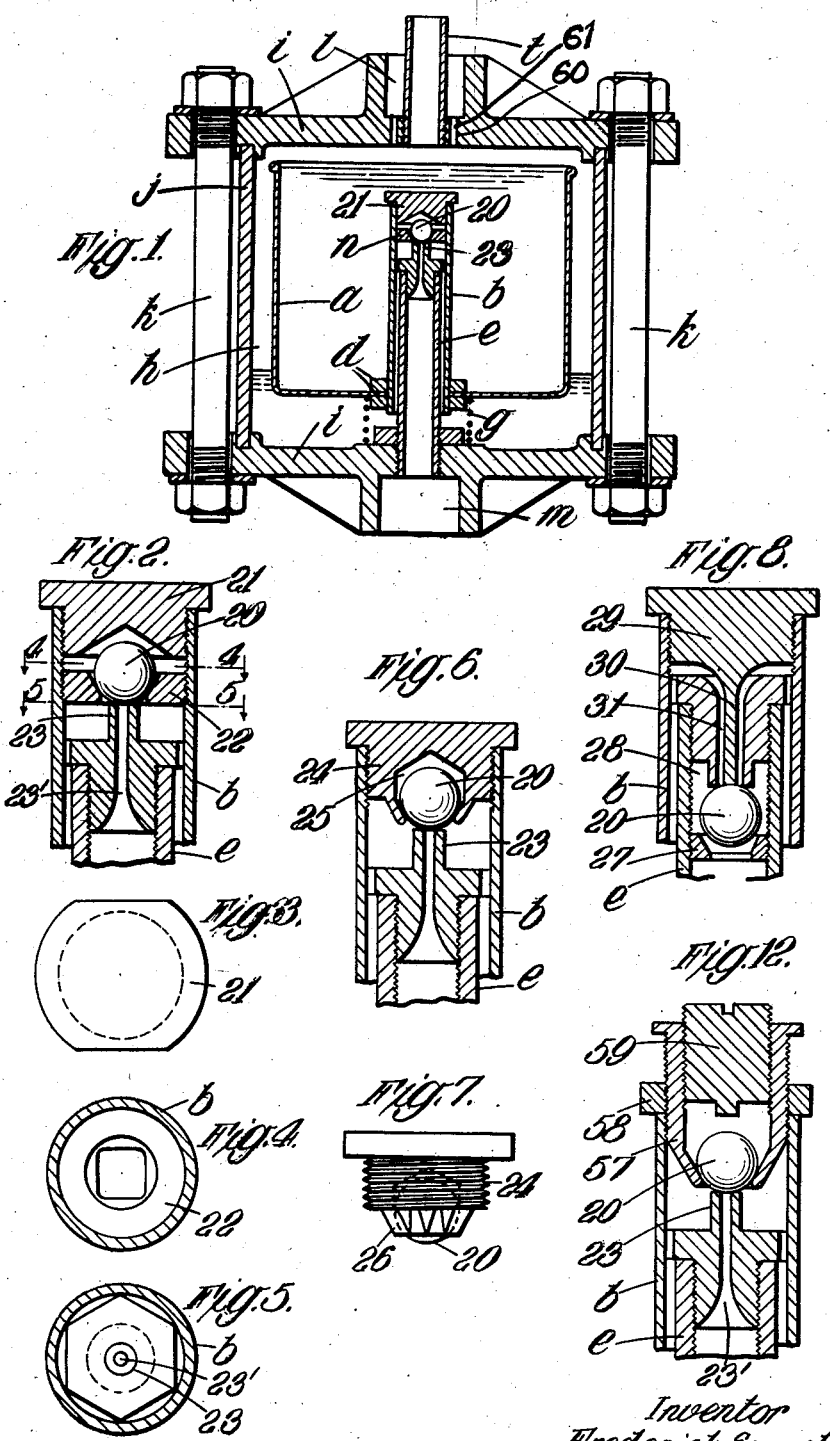
Inventor
Frederick Samuel Carter
per H.T.P.Gee
Attorney.

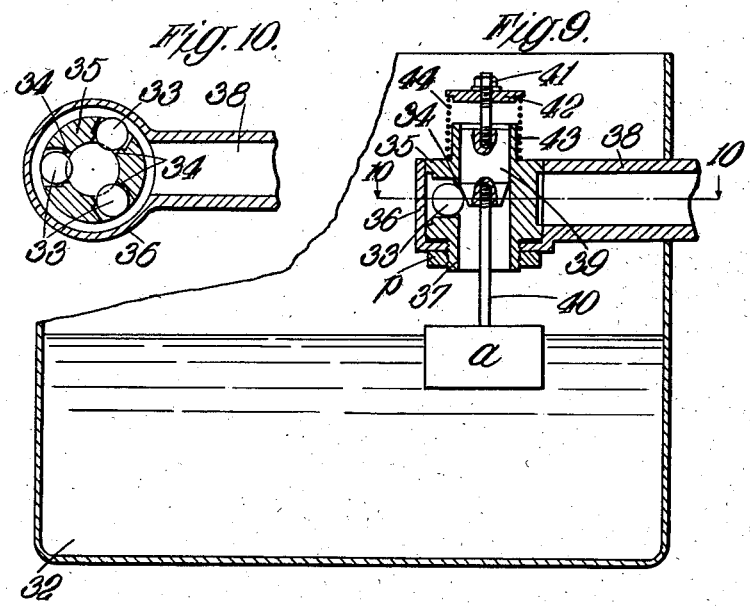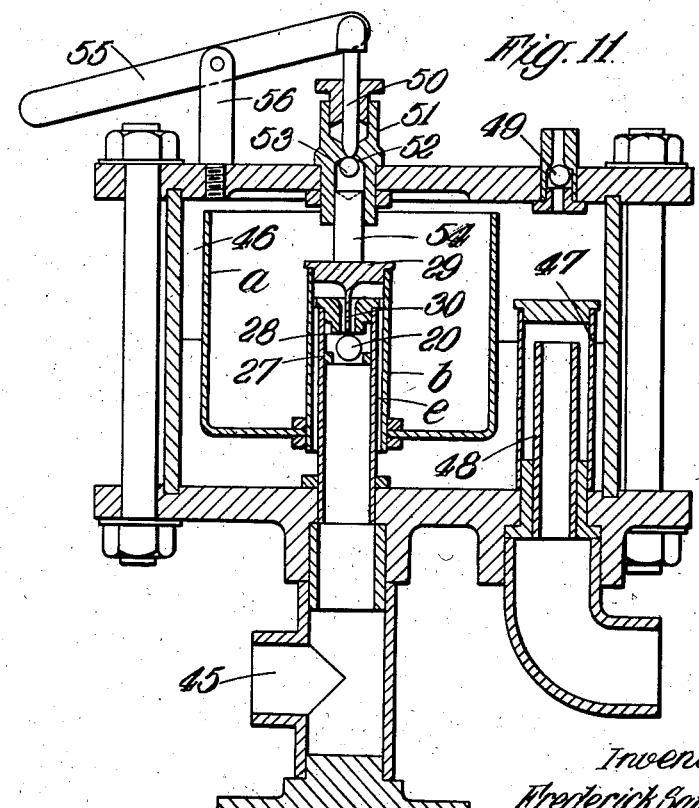

Patented May 28, 1935

2,003,069

UNITED STATES PATENT OFFICE 2,003,069

STEAM TRAP, AND APPARATUS FOR CONTROLLING OR MAINTAINING THE SUPPLY OF WATER OR OTHER FLUID

Frederick Samuel Carter, Cardiff, Wales

Application July 7, 1932, Serial No. 621,235
In Great Britain July 13, 1931

4 Claims. (Cl. 137—103)

This invention relates to improvements in steam traps, apparatus for controlling or maintaining the supply of water or other fluid, and other apparatus utilizing the movement of a float to open and close a valve. The chief object of the present invention is to provide certain new and useful constructions of float operated valves, and also generally to improve the construction and operation of steam traps and other apparatus.

The valve, according to the present invention, is of the ball type in which the ball itself comprises the valve member to open and close, by its movement relative to a valve seating, the flow through the seating.

The ball valve, according to the present invention, comprises a moving member directly connected to a float and a fixed member, one of these members, which are preferably arranged co-axially, being provided with one or more balls which co-operate with a suitable seating or suitable seatings to control the flow of liquid, the co-operation of said ball or balls with the seating or seatings being independent of any rocking movement of the float.

The present invention provides several constructional forms of ball valve defined above and also certain advantageous constructional features of steam traps and other apparatus employing a float operated valve or valves, all of which will be described hereinafter.

The attached drawings illustrate by way of example certain embodiments of the present invention and therein:

Figure 1 is a sectional view of a steam trap according to the present invention, Figure 2 is an enlarged sectional view of the valve structure shown in Figure 1, and Figure 3 is a plan view of the structure shown in Figure 2, Figure 4 is a section on line 4—4 of Figure 2, and Figure 5 is a section on line 5—5 of Figure 2.

Figure 6 is a view similar to Figure 2 showing a modified form of ball valve, and Figure 7 is a side elevation of the ball carrying member shown in Figure 6.

Figure 8 is a sectional view showing one construction of float operated ball valve suitable for controlling a steam trap or the supply of water or other liquid to a tank or cistern.

Figure 9 is a sectional view through one part of a tank or cistern showing a still further form of ball valve according to the present invention.

Figure 10 is a section on line 10—10 of Figure 9.

Figure 11 is a sectional view of an improved steam trap according to this invention, and Figure 12 is a sectional view of a suitable form of adjustable ball carrier or cage according to this invention.

Referring now more particularly to Figure 1 of the accompanying drawings, the device therein illustrated comprises a float $a$ of suitable shape and material, preferably of metal. The bottom of this float is provided with an upstanding tube $b$, this tube $b$ being either formed integrally with the float or being fixedly or adjustably attached thereto. Attached to the other end of this tube is a valve of a construction hereinafter described. Inside this tube $b$ is another tube $e$ also of suitable material and suitably attached to one end of this tube is the valve seating which has a hole of suitable size in its centre and it is arranged that the valve in the tube attached to the float can open or close this hole. This latter tube is arranged so that there is annular spaces between it and the tube attached to the float. This arrangement forms a siphon and assists in the discharge of the liquid. The weight of the float $a$ which, in this case, is always kept full of water, is balanced by a spring $g$ or other suitable arrangement. This spring may also be arranged partly to balance the pressure of the steam or other vapour. This is done by the adjusting of the nuts $d$ attaching the outer tube $b$ to the float $a$, or by raising or lowering the centre tube $e$, or in the other ways described hereinafter. The above arrangement of float, tubes and valve is suitably placed in a steam tight chamber $h$ which may be constructed of a tube of suitable material and closed at each end by flanges $i$ which are drawn together against the ends of the tube $j$ by bolts $k$ with a joint in between. The internal tube $e$ to which is attached the valve seating is rigidly attached to the bottom flange of the steam tight chamber and forms the outlet $m$.

The inlet $l$ to the steam tight chamber is formed in the top flange $i$. It is desirable to fit in this inlet a smaller central tube $t$ which allows a free passage for air to pass out from the trap.

Describing now the ball valve arrangement which is the principal feature of the present invention, in Figure 2, which is an enlarged sectional view of the arrangement shown in Figure 1, 20 is the ball valve, 21 is a cap or cover, 22 is a rest to support the ball 20, $b$ is the outer tube which is screwed at its upper end to receive the cap 21 and the rest 22. It will be seen that the tube $b$ and the parts 21 and 22 form the cage containing the ball 20. 23 is the valve seating, 23' is the discharge orifice in the seating 23, and $e$ is the inner tube above referred to. Figure 3 is a plan view of the cap 21. Figure 4 is a sectional view showing in plan the rest 22 from which, it will be seen, that there is a square hole in the centre; this allows a convenient means of screwing the rest 22 into the tube $b$, and furthermore is a suitable form to allow the passage of water or other liquid past the ball 20 when it rests on the rest 22. Figure 5 is a sectional view showing the seating 23 in plan. The flange on the seating 23 is shaped hexagonal which forms a convenient means of screwing the seat 23 into the tube e, and, at the same time, forms a guide to keep the seating 23 central in the tube e. It also forms the water passage and a screen to prevent dirt reaching the valve 20.

Figure 6 shows in section a modified form of ball valve. 20 is the ball valve, 24 is the cage which, in this case, is self-contained and is screwed into the tube b. Figure 7 is an elevation of the cage 24 and shows more clearly how the ball 20 is fixed and retained therein. A hole 25 is formed in the cage 24 somewhat larger than the ball 20, the material surrounding this hole is reduced in thickness at its lower end, and this reduced portion is slotted with slots 26. This reduced portion is then closed in after the ball 20 is placed in position as shown. The slots 26, when closed, form passages to allow the water to surround the ball valve a.

The present invention is not limited to steam traps; it may equally well be embodied in other apparatus employing a float operated valve for other purposes, for example, maintaining the level of liquid in a tank, cistern or boiler. Figure 8 shows in section one suitable arrangement of the float operated valve for use in such apparatus. In Figure 8, 20 is the ball valve, 27 is a rest to support the ball 20, and has a square hole or other suitable shape in its centre, and 28 is the valve seat. The valve seat 28 and the rest 27 are suitably screwed or otherwise fixed in the tube e and 28, e and 27 form the cage retaining the ball 20. The tube e is suitable attached to the tank or cistern or body of a steam trap receiving the water or liquid and forms the water inlet thereto. 29 is a cap screwed or otherwise fixed to the outer tube b, which tube is fixed to the float a as before. A projection 30 is formed on the cap 29 of a suitable length and diameter to project into the orifice 31 and to press against the ball 20. This projection 30 is smaller in diameter than the orifice 31 so that an annular passage way is left for the water or other liquid. The weight of the float a attached to the tube b, and the weight of the parts b and 29 are so arranged as to be sufficient to force the ball 20 away from the seat 27 against the pressure of the supply water, or steam pressure, as the case may be, in the tube e when the water or other liquid in the tank is low and not supporting the float. As the water or other liquid rises in the tank, it lifts the float, to which is attached the parts b and 29, and so relieves the pressure on the ball 20 and allows it to be forced against its seating 27 by the supply pressure.

Figure 9 shows a further form of float operated valve suitable for controlling the supply of water or other liquid to a tank or cistern 32, and Figure 10 is a sectional plan view of the same arrangement. 33 are ball valves which coact with seatings 34, these seatings being suitable formed in a multiple casing or cage 35 made of suitable material. This casing 35 is enclosed by a cover 36, the joint between 35 and 36 being slightly conical, and these joints are drawn tightly together by means of the screwed portion 37 formed on the lower part of 35 and on to which is screwed a lock nut p to pull the joints tightly together. The cover 36 forms a part of the tube 38 which is conveniently attached to the tank or cistern 32. The ball valves 33 are forced off their seatings 34 by means of a conically shaped plunger 39 which is directly attached to the float a by means of the rod 40. It is necessary to provide some means of preventing the plunger 39 from falling right out of its guide should the water or other liquid in the tank fall very low or be drawn off altogether, and this may conveniently be done by means of the nut 41 which screws on to a rod 40 screwed into the plunger 39 and holds the plate 42 in position. The plate 42 comes in contact with a projection 43 when the float is in its lowest position. It may be desirable at times to insert a spring 44 between 42 and 35, but this is not always necessary.

Figure 11 of the accompanying drawings illustrates the application of a float operated ball valve of the form shown in Figure 8 of the accompanying drawings to a steam trap. Steam and condensate is fed to the inlet 45 and will be admitted through the ball valve to the chamber 46. Condensate will collect in the chamber 46 and, as the float, which is water filled, is balanced, will lift the float until such time as the projection 30 on the cap 29 ceases to press the ball 20 away from the seating 28. When the float a has lifted to this extent, the admission of steam and condensate to the chamber 46 will be cut off. In order then to effect the discharge of the condensate and to maintain the constant functioning of the apparatus, I provide a siphon discharge device consisting of outer and inner tubes 47 and 48, the level of the upper end of the inner tube being just below the level of water necessary to lift the float a sufficient to cause the valve to close. As soon, therefore, as the valve closes, siphonic discharge through the tubes 47, 48 takes place, the condensate is discharged, the float a will fall, and the projection 30 will again engage with the ball 20 to force it off the seating 28. The condensate will, therefore, again commence to collect in the chamber 46 and will be discharged when it again reaches the level of the upper end of the inner tube 48.

49 is a ball valve controlled air inlet to the chamber 46 to facilitate the siphonic discharge.

Now, in steam traps, it is desirable to provide means for raising or lowering the float in order that the trap may be blown through. The present invention provides means for accomplishing this in an easy manner which will resist any internal pressure in the steam chamber. Figure 11 shows a suitable embodiment of this part of my invention. The device comprises a light rod 50 passing through a stuffing box or gland 51 which is suitably fixed in the chamber 46. The internal portion of this stuffing box is bored out somewhat larger than the bore receiving the rod 50 so that a shoulder or ledge 52 is left which forms a seating for a ball valve 53. Inside the lower bore of the stuffing box 51 is disposed a plunger 54, freely slidable in the bore and bearing on the cap 29 or other suitable part of the float. The operating rod 50 is adapted to be operated by a hand lever 55, pivoted in a bracket 56, or by any other suitable means. It will be seen that by operating the lever 55, the float may be depressed to enable the trap to be blown through. Where it is necessary to lift the float to enable the trap to be blown through, as, for example, in the case of the ball valves shown in Figures 1, 2, 6 and 12 of the accompanying drawings, the blow through device may be disposed at the bottom of the chamber and be arranged to lift the float.

The ball 53 and its seating 52 will, of course, effectively seal the blow through device.

When the ball valve, according to the present invention, is incorporated in a steam trap with the two co-axial tubes b and e above referred to, it is desirable to provide some means for adjusting the relative positions of the ball 20 and the valve seating, in order to secure the most effective operation of the device. This may be accomplished in many ways, for example, by making either or both of the tubes b and e adjustable in the float and chamber respectively, or by means of the special ball valve construction shown in Figure 12 of the accompanying drawings. In this construction, the ball 20 is held in a tube 57 screwed into the upper end of the tube b and held therein by means of a lock nut 58. The internal bore of the tube 57 is screw-threaded to receive a screwed rod 59 which can be screwed into or out of the tube 57 to a greater or less extent and so forms an adjustable abutment to limit the upward movement of the ball. This then will have the same effect as a relative adjustment of the tubes b and e. 60 (Figure 1) is a web across the lower end of the inlet l and 61 are apertures therein.

Among the many advantages of this invention may be mentioned, firstly, that the valve is in most cases watersealed, secondly, that the valve is adjustable to compensate for varying pressures and also for wear on the seating, and thirdly, that the operation of the ball valve is in all cases independent of any rocking movement of the float to which the movable member is directly connected without the interposition of any levers.

I claim:—

1. A steam trap comprising a casing having an inlet for the steam and an outlet for the condensate, a float filled with water in said casing, a spring bearing at one end on the bottom of the float and at the other end on the bottom of the casing to balance the weight of the filled float, an inner tube carried by the casing and communicating with the outlet, an outer tube, open at its lower end to the casing and co-axial with said inner tube, attached to the float and arranged to leave an annular space around the inner tube, and a ball valve comprising a ball, a hollow plug adjustably carried at the upper end of said outer tube and containing said ball, a solid plug adjustably screwed into the upper end of said hollow plug to close the same and to form a cage for the ball, and a seating fixed in the upper end of said inner tube and having radial projections to form a guide for the outer tube, said seating being adapted to receive the ball and seal the entry to the inner tube, the arrangement being such that the ball is freely attached to the float and the steam pressure holds the ball against the seating until such time as the amount of condensate raises the float sufficiently to carry the ball clear of the seating, whereupon the condensate siphons away over the top of the inner tube.

2. A steam trap comprising a casing having an inlet for the steam and an outlet for the condensate, a central tube in said inlet to allow a free passage of air out of the trap, a float in said casing, an inner tube carried by the casing and communicating with the outlet, an outer tube, open at its lower end to the casing and co-axial with said inner tube, attached to the float and arranged to leave an annular space around the inner tube, and a ball valve comprising a ball carried by the float and a seating on the inner tube adapted to receive the ball to seal the entry to the inner tube, the arrangement being such that the ball is freely attached to the float and the steam pressure holds the ball against the seating until such time as the amount of condensate raises the float sufficiently to carry the ball clear of the seating, whereupon the condensate siphons away over the top of the inner tube.

3. A steam trap comprising a casing having an inlet for the steam, a web across said inlet having apertures to allow the free ingress of steam, a centrally disposed tube on said web communicating at its lower end with the casing and projecting at its upper end above the inlet to allow a free passage of air out from the trap, an outlet for the condensate, a float in said casing, an inner tube carried by the casing and communicating with the outlet, an outer tube, open at its lower end to the casing and co-axial with said inner tube, attached to the float and arranged to leave an annular space around the inner tube, and a ball valve comprising a ball carried by the float and a seating on the inner tube adapted to receive the ball to seal the entry to the inner tube, the arrangement being such that the ball is freely attached to the float and the steam pressure holds the ball against the seating until such time as the amount of condensate raises the float sufficiently to carry the ball clear of the seating, whereupon the condensate siphons away over the top of the inner tube.

4. A steam trap comprising a casing having an inlet for the steam, a web across said inlet having apertures to allow the free ingress of steam, a centrally disposed tube on said web communicating at its lower end with the casing and projecting at its upper end above the inlet to allow a free passage of air out from the trap, an outlet for the condensate, a float filled with water in said casing, a spring bearing at one end on the bottom of the float and at the other end on the bottom of the casing to balance the weight of the filled float, an inner tube carried by the casing and communicating with the outlet, an outer tube, open at its lower end to the casing and co-axial with said inner tube, attached to the float and arranged to leave an annular space around the inner tube, and a ball valve comprising a ball, a hollow plug adjustably carried at the upper end of said outer tube and containing said ball, a solid plug adjustably screwed into the upper end of said hollow plug to close the same and to form a cage for the ball, and a seating screwed into the inner tube and having radial projections to form a guide for the outer tube, said seating being adapted to receive the ball and seal the entry to the inner tube, the arrangement being such that the ball is freely attached to the float and the steam pressure holds the ball against the seating until such time as the amount of condensate raises the float sufficiently to carry the ball clear of the seating, whereupon the condensate siphons away over the top of the inner tube.

FREDERICK SAMUEL CARTER.